United States Patent
Fang et al.

(10) Patent No.: US 8,649,293 B2
(45) Date of Patent: Feb. 11, 2014

(54) CONTROL INFORMATION TRANSMISSION METHOD AND CONTROL INFORMATION RECEIVING TERMINAL

(75) Inventors: Huiying Fang, Shenzhen (CN); Hongyun Qu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 179 days.

(21) Appl. No.: 13/060,660

(22) PCT Filed: Dec. 31, 2008

(86) PCT No.: PCT/CN2008/073898
§ 371 (c)(1),
(2), (4) Date: May 2, 2011

(87) PCT Pub. No.: WO2010/022577
PCT Pub. Date: Mar. 4, 2010

(65) Prior Publication Data
US 2011/0235547 A1    Sep. 29, 2011

(30) Foreign Application Priority Data
Aug. 28, 2008    (CN) .......................... 2008 1 0215808

(51) Int. Cl.
*H04L 12/28* (2006.01)
(52) U.S. Cl.
USPC ....................................... 370/254; 455/343.1
(58) Field of Classification Search
USPC .................. 370/254, 338; 455/343.1
See application file for complete search history.

(56) References Cited

U.S. PATENT DOCUMENTS

| 2007/0047493 A1 | 3/2007 | Park et al. |
| 2007/0121743 A1* | 5/2007 | Zuckerman et al. .......... 375/260 |
| 2008/0032632 A1 | 2/2008 | Choi et al. |
| 2008/0089297 A1 | 4/2008 | Seo et al. |
| 2008/0117887 A1* | 5/2008 | Joung et al. .................... 370/338 |
| 2009/0325533 A1* | 12/2009 | Lele et al. .................. 455/343.1 |

FOREIGN PATENT DOCUMENTS

| CN | 101039169 A | 9/2007 |
| WO | 2007052916 A1 | 5/2007 |

* cited by examiner

*Primary Examiner* — Wei Zhao
(74) *Attorney, Agent, or Firm* — Hultquist PLLC; Mary B. Grant; Steven J. Hultquist

(57) ABSTRACT

A control information transmission method and a control information receiving terminal are provided. The transmission method comprises: notifying a terminal of setting information of control information in a downlink subframe (S202); and transmitting the control information to the terminal in a preset subframe and other subframes determined according to the setting information (S204). By transmitting the control information on part of the 16m subframes and notifying the 16m terminal of the information of setting the control information, the present invention enables the 16m terminal to shut down the RF transmission at the location of a subframe where the control information is not included and no resource related to the terminal is assigned, and to enter the micro sleep mode, which reduces power consumption of the terminal.

17 Claims, 9 Drawing Sheets

CONTROL INFORMATION TRANSMISSION METHOD AND CONTROL INFORMATION RECEIVING TERMINAL

CROSS-REFERENCE TO RELATED APPLICATIONS

This application is a U.S. national phase application under the provisions of 35 U.S.C. §371 of International Patent Application No. PCT/CN08/73898 filed Dec. 31, 2008, which in turn claims priority of Chinese Patent Application No. 200810215808.6 filed Aug. 28, 2008. The disclosures of such international patent application and Chinese priority patent application are hereby incorporated by reference herein in their respective entireties, for all purposes.

FIELD OF THE INVENTION

The present invention relates to communication field, in particular to a control information transmission method and a control information receiving terminal.

BACKGROUND OF THE INVENTION

Orthogonal Frequency Division Multiplexing (OFDM for short) technology is able to convert data streams transmitted at a high speed to data streams transmitted at a low speed and in parallel, and thereby, is able to reduce the sensitivity of a system towards frequency selectivity of a multi-path fading channel.

The OFDM technology is further improved on the ability of resisting intersymbol interference, by introducing a cyclic prefix into the OFDM technology.

Currently, with the features such as high bandwidth utilization rate and easy implementation, the OFDM technology has been more and more widely used in the field of wireless communications. Worldwide Interoperability for Microwave Access (WiMAX for short) system based on Orthogonal Frequency Division Multiple Access (OFDMA for short) is a system using the OFDM technology.

Meanwhile, with the development of communication technology, the mobile WiMAX system based on IEEE802.16e air interface standard cannot satisfy users' requirements for high transmission rate, high throughput, fast moving and low delay in broadband mobile communications.

Currently, Task Group m (TGm for short) of IEEE802.16 group is dedicated to making an improved air interface specification 802.16m, and the specification can support higher peak rate and higher spectral efficiency and sector capacity.

In order to satisfy the effective application of low-delay service in the 16m system, a three-layer design idea of super frame, unit frame and subframe are mainly taken into account in the current design of the 16m frame structure, wherein the structure of the three-layer design can be obtained by referring to FIG. 1.

As shown in FIG. 1, in the super frame structure proposed in the current 16m frame structure design, super frame 101 has a length of 20 ms, and is composed of four unit frames 102 of 5 ms. Super frame control information 103 is in several symbols at the beginning of a super frame. Unit frame 102 is composed of eight subframes 104, and the subframes 104 are divided into downlink subframes and uplink subframes, which can be configured according to the system. The subframe 104 is composed of 6 OFDM symbols 105.

On the basis of such three-layer frame structure of super frame, unit frame and subframe, a 16m terminal cannot acquire in advance the setting information of the control information in a unit frame, and as a result, when receiving the unit frame, the 16m terminal needs to open all of the radio frequency transmissions to acquire the control information in the unit frame, which increases the power consumption of the 16m terminal.

SUMMARY OF THE INVENTION

The present invention is provided in view of the problems of excessive power consumption of the 16m terminal because a 16m terminal cannot acquire in advance the setting information of the control information in a unit frame which makes the 16m terminal need to open all of the radio frequency transmissions to acquire the control information in the unit frame when receiving the unit frame. Thus, the present invention aims to provide an improved control information transmission solution to solve at least one of the above problems.

According to an aspect of the present invention, a control information transmission method is provided, the method comprises: notifying a terminal of setting information of control information in a downlink subframe; and transmitting the control information to the terminal in preset subframe(s) and other subframes determined according to the setting information.

The step of notifying a terminal of setting information of control information in a downlink subframe comprises one of the following: notifying the terminal of the setting information of the control information in the downlink subframe in the form of sending a message; and notifying the terminal of the setting information of the control information in the downlink subframe in the form of setting a default value in the terminal in advance.

In the above, the preset subframe is the first 16m downlink subframe after an uplink/downlink conversion point.

Preferably, for a unit frame with 2 conversion points, the preset subframe is the first 16m downlink subframe in the unit frame; and for a unit frame with 4 conversion points, the preset subframes are the first 16m downlink subframe in the unit frame and the first 16m downlink subframe after an uplink/downlink conversion point.

The above setting information is a subframe interval; the subframe interval is 1 subframe, 2 subframes, 3 subframes, or 4 subframes; the subframe interval is set according to the proportion of uplink subframes to downlink subframes in a unit frame and subframe configuration information.

The control information sent in the Nth downlink subframe comprises information related to the Nth downlink subframe, the (N+1)th downlink subframe, . . . , the (N+(M−1))th downlink subframe, wherein, N is an integer greater than or equal to 1, and M is the subframe interval.

In addition, the setting information is a subframe bitmap. Specifically, the length of the subframe bitmap is determined according to the proportion of downlink subframes to uplink subframes and 16m/16e subframe configuration information.

For the unit frame with 2 conversion points, the length of the subframe bitmap equals the number of the downlink 16m subframes in the unit frame minus 1; and for the unit frame with 4 conversion points, the length of the subframe bitmap equals the number of the downlink 16m subframes in the unit frame minus 2.

In the above, the subframe bitmap is set according to the following manners: except the first downlink subframe, setting as 1 the bitmap bit(s) corresponding to a downlink subframe which contains the control information, and setting as 0 the bitmap bit(s) corresponding to a downlink subframe which does not contain the control information; alternatively setting as 0 the bitmap bit(s) corresponding to a downlink subframe which contains the control information, and, setting as 1 the bitmap bit(s) corresponding to a downlink subframe which does not contain the control information.

Preferably, the control information sent in the Nth downlink subframe comprises information related to the Nth downlink subframe, the (N+1)th downlink subframe, . . . , the (N+L)th downlink subframe, wherein N is an integer greater than or equal to 1, L is the number of bitmap bits 0 between the bitmap bit 1 corresponding to the Nth downlink subframe and the next bitmap bit 1.

Preferably, the control information sent in the Nth downlink subframe comprises information related to the Nth downlink subframe; for a unit frame with 2 conversion points, the control information contained in the preset subframe carries information related to a downlink subframe that does not send the control information; and for a unit frame with 4 conversion points, the control information contained in the preset subframe between two conversion points carries information related to a downlink subframe that is between two conversion points and does not send the control information.

According to another aspect of the present invention, a control information receiving terminal is provided, for receiving the control information of the above transmission method, the receiving terminal comprises: an acquiring module configured to acquire setting information of control information in a downlink subframe with the control information sent by a transmission terminal; a receiving module configured to receive a unit frame sent by the transmission terminal; and a decoding module configured to decode the control information in the unit frame according to preset subframe(s) and the setting information.

Preferably, the above receiving terminal also comprises: a storage module configured to store a default value, the default value being setting information of the control information in a downlink subframe.

Wherein, the above preset subframe is the first 16m downlink subframe after an uplink/downlink conversion point.

Preferably, for a unit frame with 2 conversion points, the preset subframe is the first downlink subframe in the unit frame; and for a unit frame with 4 conversion points, the preset subframes are the first downlink subframe in the unit frame and the first downlink subframe after an uplink/downlink conversion point.

Preferably, the setting information is a subframe interval.

Preferably, the setting information is a subframe bitmap.

And the above decoding module comprises: a first decoding sub module configured to decode the control information of the preset subframe(s); and a second decoding sub module configured to decode control information of other subframes determined according to the setting information.

With at least one of the above technical solutions, by transmitting the control information on part of the 16m subframes and notifying the 16m terminal of the information of setting the control information, the present invention enables the 16m terminal to shut down the RF transmission at the subframe location where the control information is not included and no resource related to the terminal is assigned, and to enter the micro sleep mode, which reduces power consumption of the terminal.

BRIEF DESCRIPTION OF THE ACCOMPANYING DRAWINGS

The drawings herein are used to provide further understanding of the present invention and form a part of the specification. The exemplary embodiments of the present invention and the description thereof are used to explain the present invention rather than unduly limit the present invention. In the accompanying drawings.

Figure 3A:
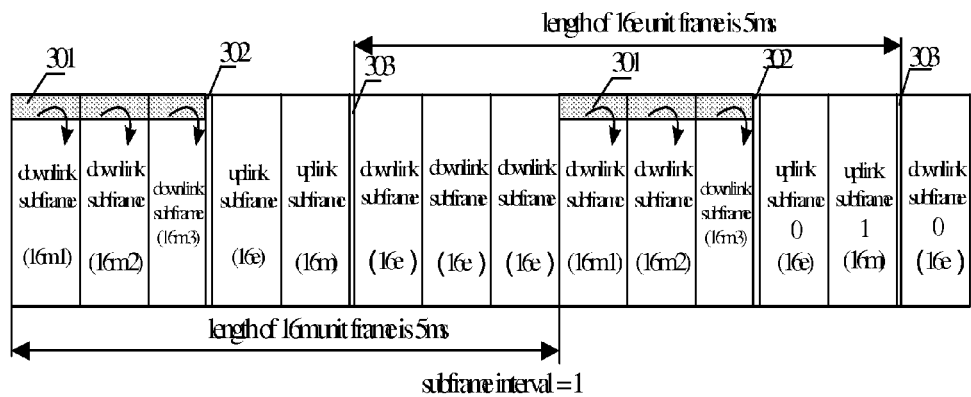
Figure 3B:
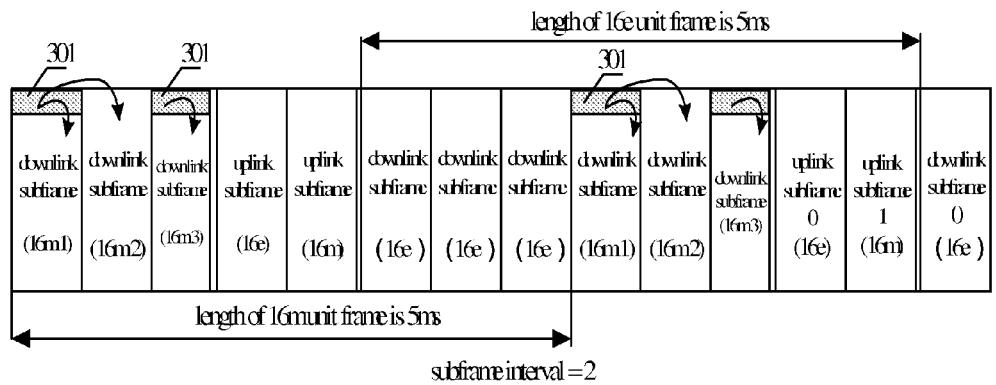
Figure 3C:
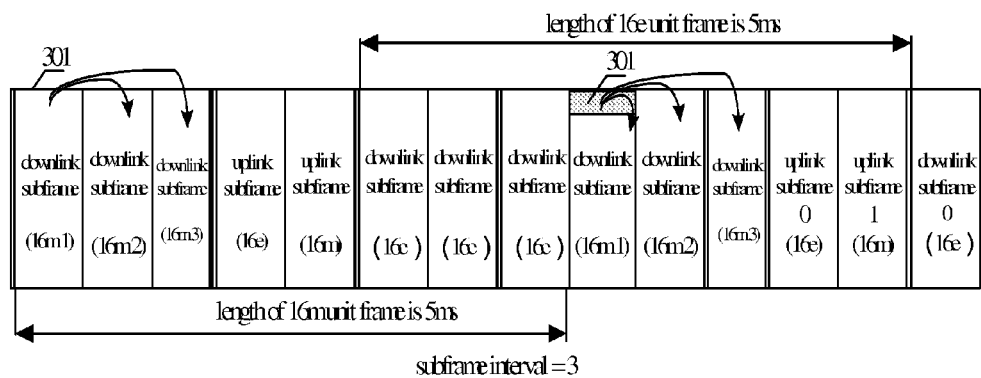
Figure 4A:
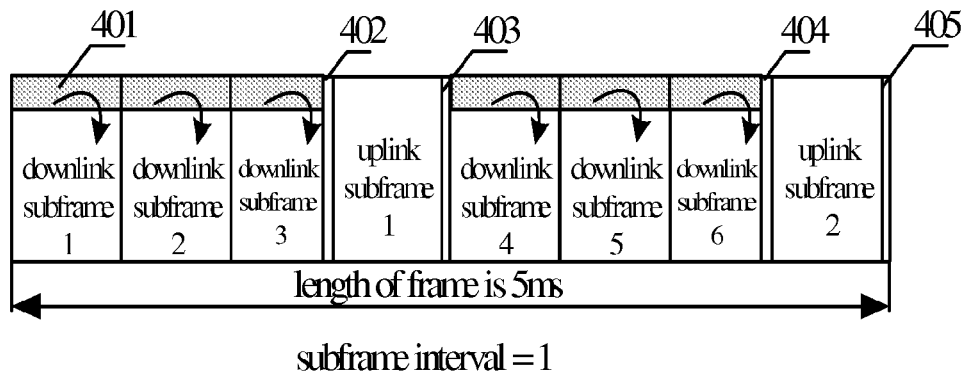
Figure 4B:
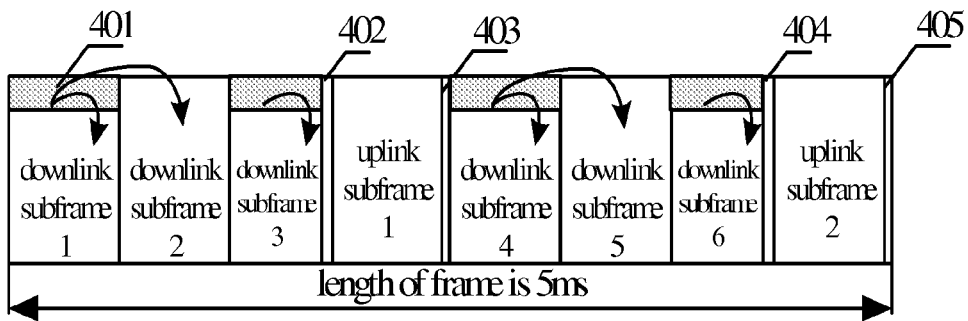
Figure 4C:
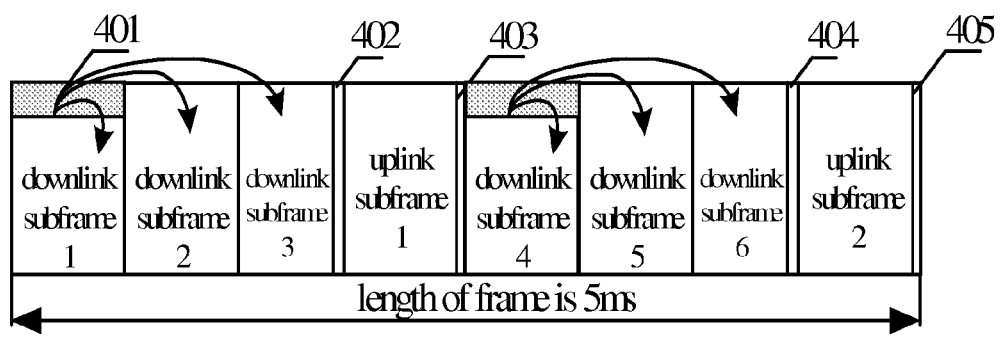
Figure 5A:
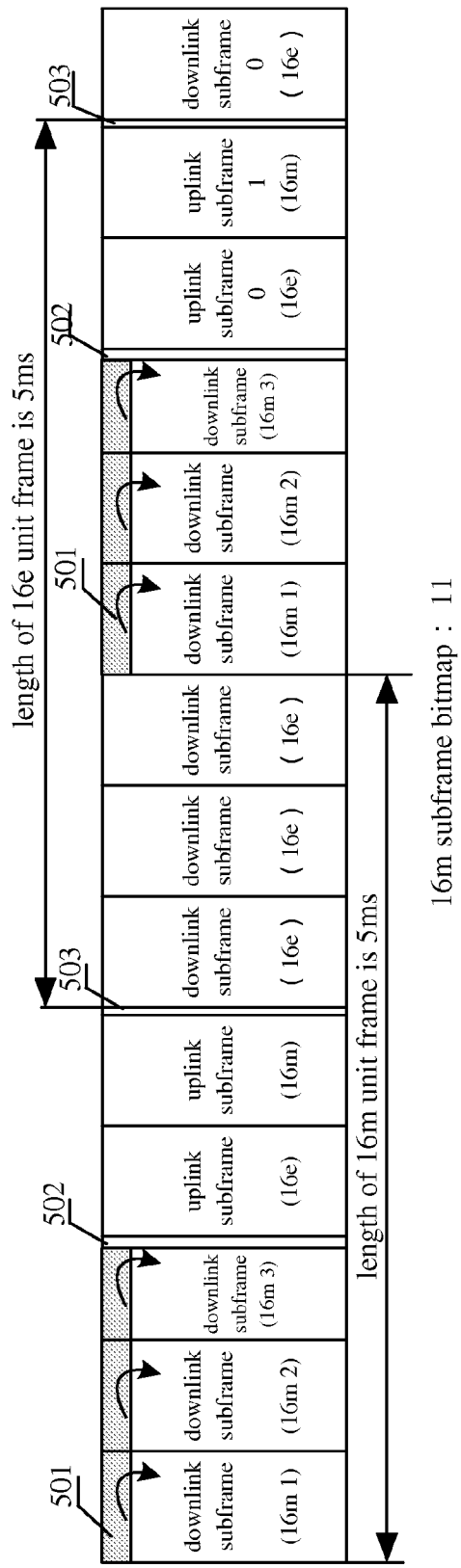
Figure 5B:
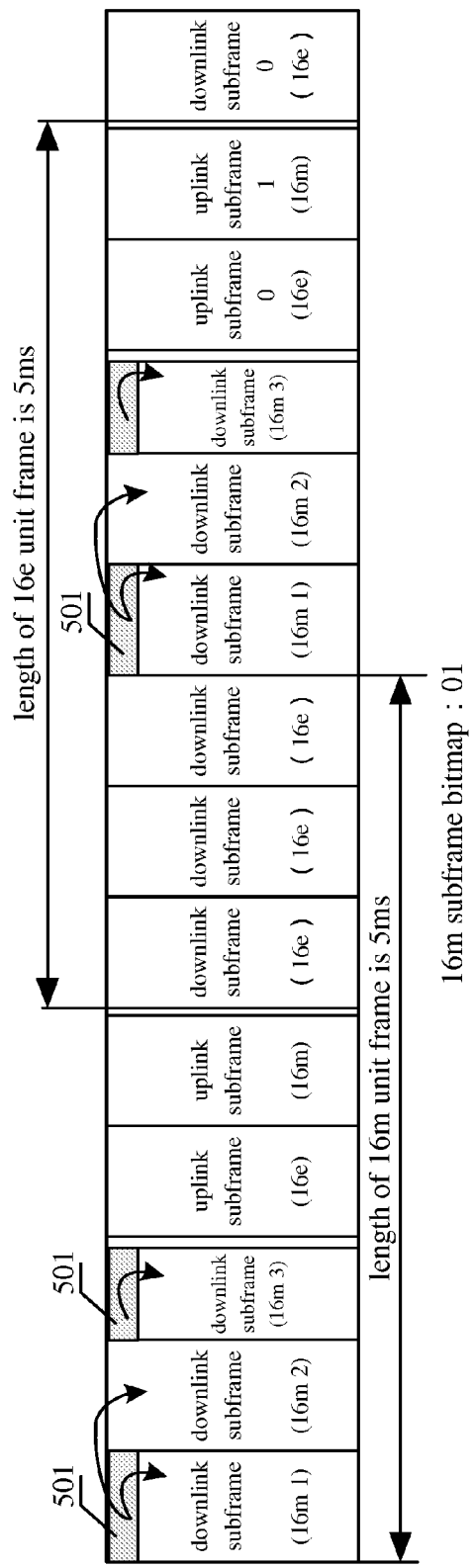
Figure 5C:
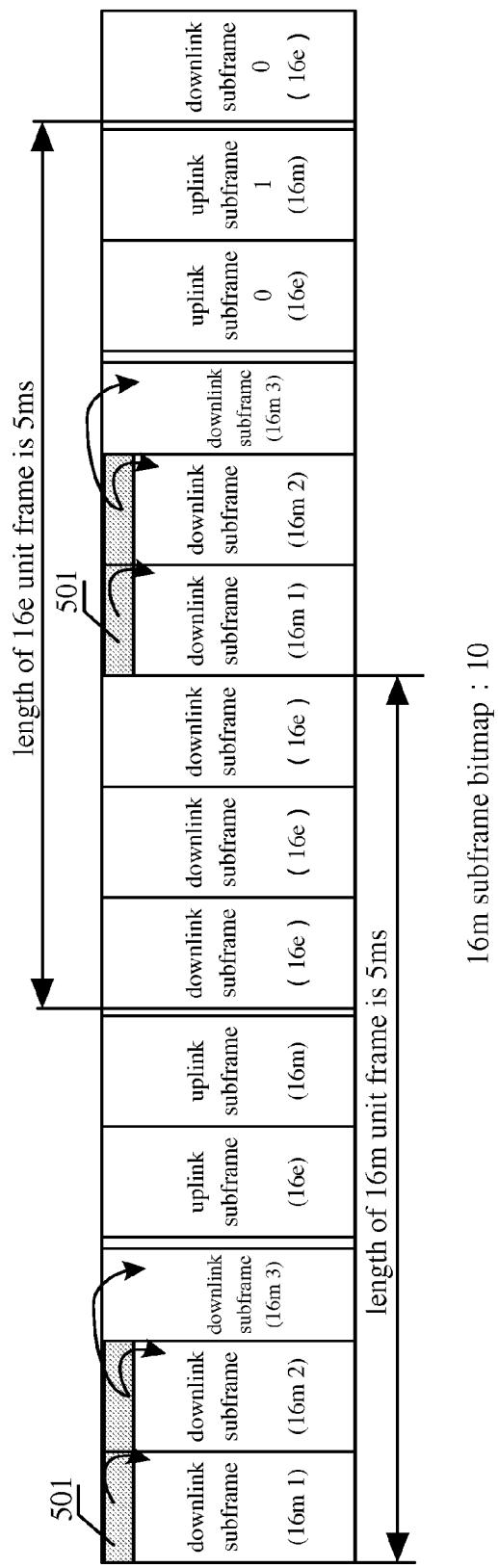
Figure 6A:
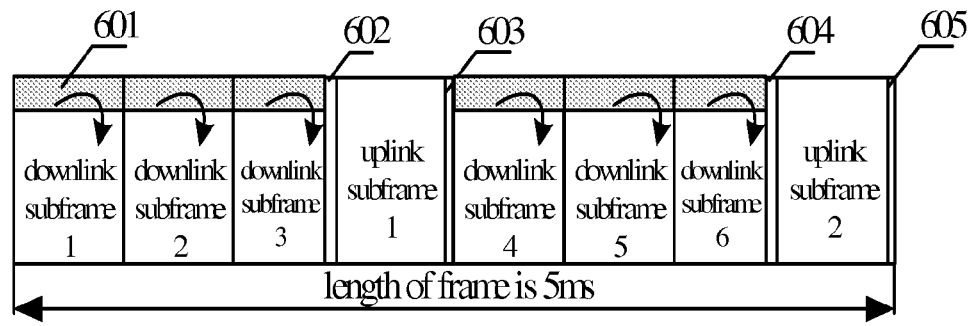
Figure 6B:
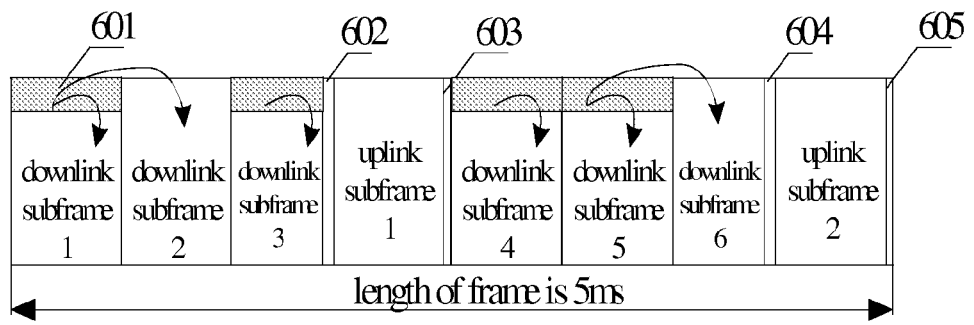
Figure 6C:
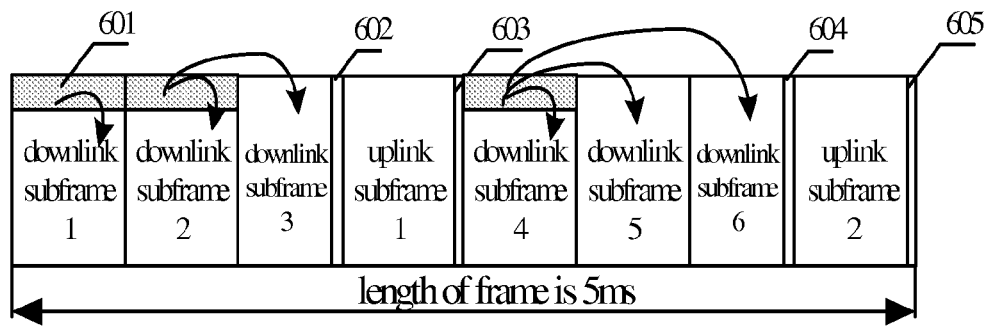
Figure 7:
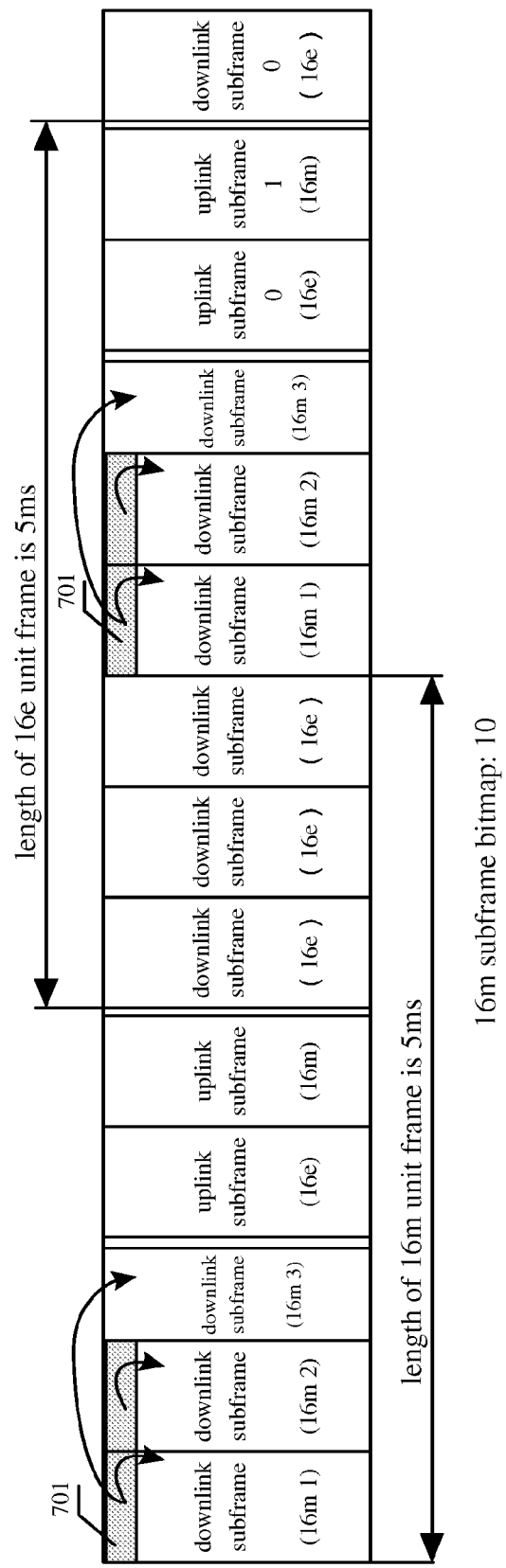
Figure 8:
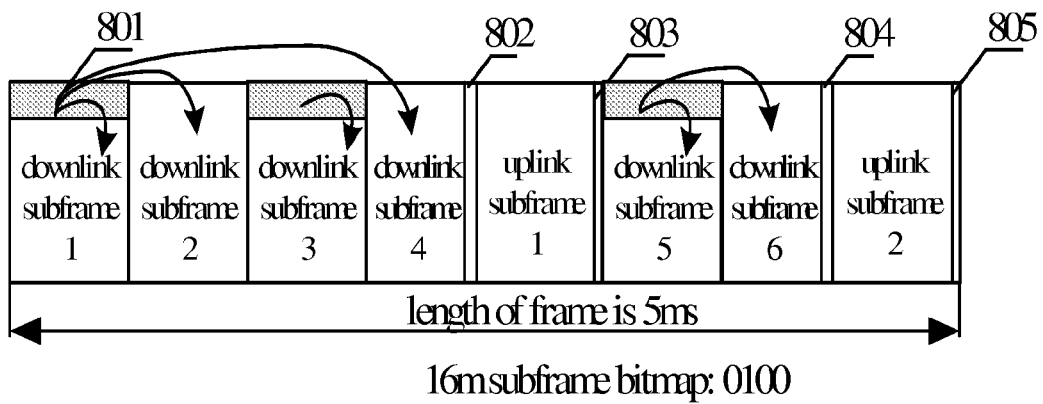
Figure 9:
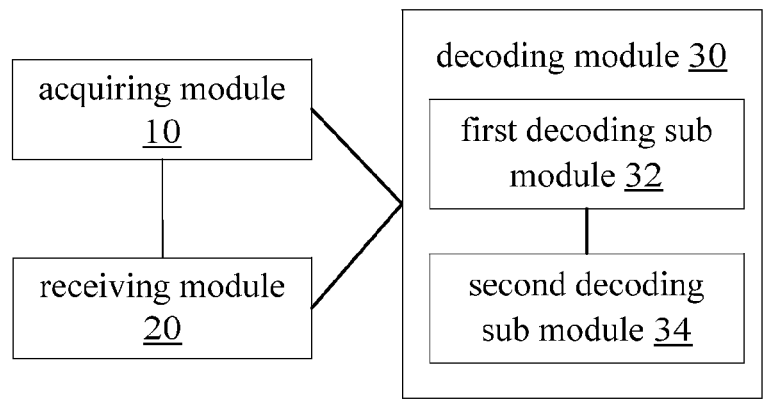

FIGS. 3*a*, 3*b*, and 3*c* are schematic diagrams of a method of transmitting user dedication control information according to a subframe interval in the case of a unit frame with 2 conversion points according to a method embodiment of the present invention;

FIGS. 4*a*, 4*b*, and 4*c* are schematic diagrams of a method of transmitting user dedication control information according to a subframe interval in the case of a unit frame with 4 conversion points according to a method embodiment of the present invention;

FIGS. 5*a*, 5*b*, and 5*c* are schematic diagrams of a manner of transmitting user dedication control information according to a 16m subframe bitmap in the case of a unit frame with 2 conversion points according to a method embodiment of the present invention;

FIGS. 6*a*, 6*b*, and 6*c* are schematic diagrams of a manner of transmitting user dedication control information according to a 16m subframe bitmap in the case of a unit frame with 4 conversion points according to a method embodiment of the present invention;

FIG. 7 is a schematic diagram of another manner of transmitting user dedication control information according to a 16m subframe bitmap in the case of a unit frame with 2 conversion points according to a method embodiment of the present invention;

FIG. 8 is a schematic diagram of another manner of transmitting user dedication control information according to a 16m subframe bitmap in the case of a unit frame with 4 conversion points according to a method embodiment of the present invention; and FIG. 9 is a block diagram of a control information receiving terminal according to an apparatus embodiment of the present invention.

DETAILED DESCRIPTION OF THE PREFERRED EMBODIMENTS

Brief Description on Functions

In the technical solution provided in an embodiment of the present invention, according to the requirements of delay performance of system service, the control information is transmitted on part of the 16m subframes and the terminal is notified of the information of setting the part of 16m subframes, such that the 16m terminal can shut down the RF transmission at the subframe location where the control information is not included and no resource related to the terminal is assigned, and enter the micro sleep mode, which reduces power consumption of the terminal.

The present invention is now described in detail with reference to the drawings and in conjunction with the embodiments. It shall be explained that the embodiments of the present invention and the features of the embodiments can be combined with each other if there is no conflict.

Method Embodiment

Figure 1:
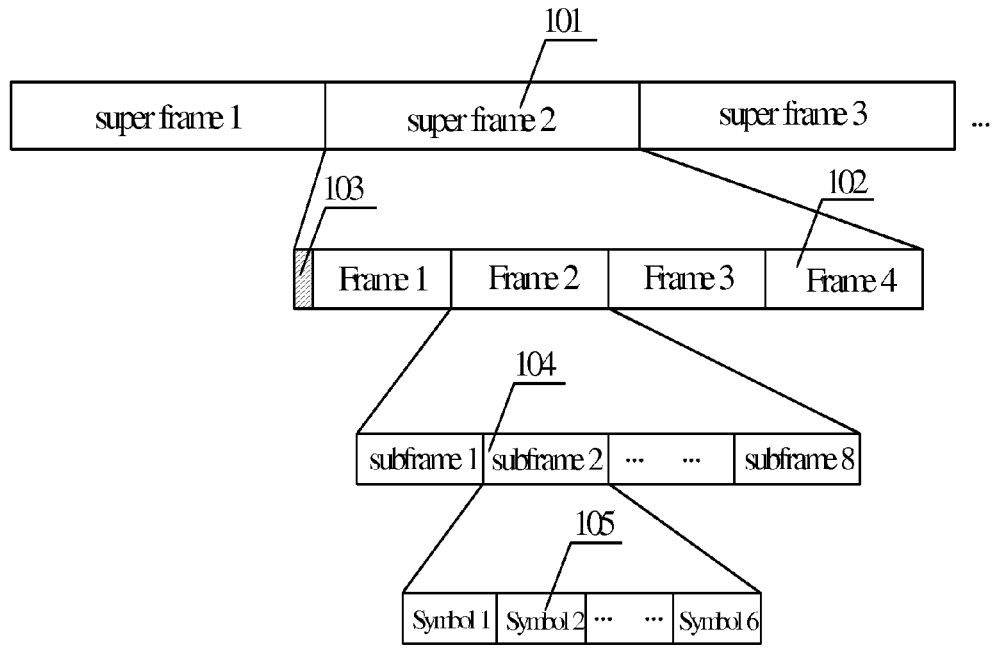
FIG. 1 is a structural schematic diagram of a super frame proposed in 16m frame structure design in relevant technology.
Figure 2:
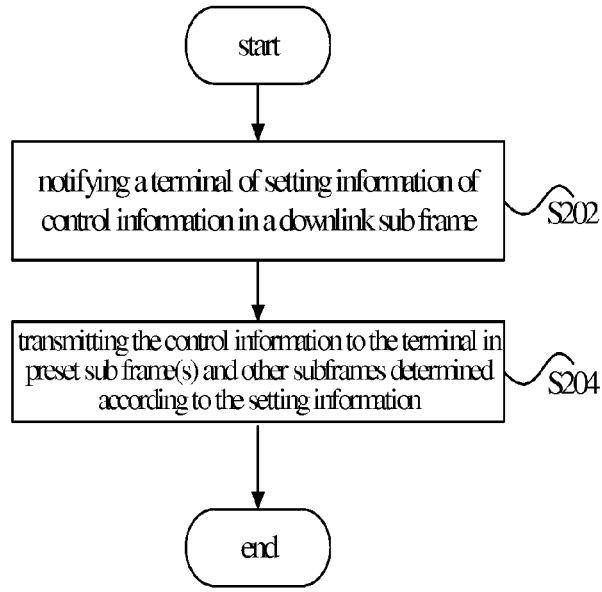
FIG. 2 is a flow chart of a control information transmission method according to a method embodiment of the present invention.

Based on the frame structure as shown in FIG. 1, in view of the problem of excessive power consumption of the 16m terminal of the three-layer frame structure in the prior art, the embodiment of the present invention provides a control information transmission method. In the method, according to the requirements of delay performance of system service, the control information is transmitted on part of the 16m subframes and the terminal is notified of the information of setting the part of 16m subframes, such that the terminal can shut down the RF transmission at the subframe location where the control information is not included and no resource related to the terminal is assigned, and enter the micro sleep mode, which reduces power consumption of the terminal. The subframes described hereinafter all refer to 16m subframes. The method is described in detail in conjunction with FIG. 2 as follows, and as shown in FIG. 2, the method comprises Step S202-Step S204 as follows:

Step S202, notifying the terminal of the setting information of the control information in the downlink subframe, which can be specifically embodied in the form of sending a message, wherein the message sent carries the setting information of the control information in the downlink subframe; or embodied in the form of setting a default value in the terminal in advance, viz. the default value is the setting information of the control information in the downlink subframe, by which it is not necessary to notify the terminal in the above form of a message; and Step S204, transmitting the control information to the terminal in the preset subframe and other subframes determined according to the setting information.

In the embodiment of the present invention, the control information is preferably the user dedication control information. The user dedication control information refers to control information assigned to be sent to one user or several users, for example, scheduling assignment, power control or ACK/NACK (positive acknowledgement/negative acknowledgement) information. The embodiment of the present invention is described hereafter in detail with user dedication control information.

A fixed subframe (the above mentioned preset subframe) containing user dedication control information is the first 16m downlink subframe after an uplink/downlink conversion point, viz. the first 16m downlink subframe in each 16m unit frame (hereafter referred to as unit frame for short). However, for a unit frame with 4 conversion points, the fixed subframe containing user dedication control information also includes the first 16m downlink subframe after an uplink/downlink conversion point, wherein the conversion point refers to the changing point of transmission direction of the subframe, for example, the conversion point from an uplink subframe to a downlink subframe is indicated as an uplink/downlink conversion point, and the conversion point from a downlink subframe to an uplink subframe is indicated as a downlink/uplink conversion point.

Preferably, the above setting information can be a subframe interval or a subframe bitmap, viz. the transmission location of other user dedication control information in a radio frame can be indicated by the subframe interval for transmitting the user dedication control information, or indicated by a 16m subframe bitmap for indicating the transmission location of the user dedication control information.

For the case where the setting information is a subframe interval, the sub frame interval can be set by system default setting (e.g., the subframe interval is one 16m subframe) or by system background. If the subframe interval is set by system default setting, the subframe interval information can be set in a super frame control header to be sent to the terminal, or can be notified to the terminal in the manner of broadcasting at a location other than the super frame header. If the subframe interval is set by system background, the subframe interval information can be notified to the terminal through the system in the manner of broadcasting.

According to the proportion of uplink subframes to downlink subframes in the unit frame and the subframe configuration information, the subframe interval which can be set by system background is 1 subframe, 2 subframes, 3 subframes, or 4 subframes. For example, in a unit frame with 2 conversion points, the subframe interval can be set as 3 or 4 (subframes); and in a unit frame with 4 conversion points, the subframe interval can be set as 3 (subframes).

In the above, the control information sent in the Nth downlink subframe includes information related to the Nth downlink subframe, the (N+1)th downlink subframe, . . . , the (N+(M−1))th downlink subframe, wherein N is an integer greater than or equal to 1, and M is a subframe interval. That is, the user dedication control information of the Nth subframe contains user's information such as data scheduling and power control in the Nth subframe, the (N+1)th, . . . , the (N+(M−1))th subframe. The information related to the downlink subframe can be user's information such as data scheduling and power control, viz. the information such as data scheduling and power control in a 16m subframe which does not contain user dedication control information is indicated in the closest subframe before the same, with closest subframe containing user dedication control information.

In conjunction with FIGS. 3a, 3b, 3c and FIGS. 4a, 4b, 4c, it is described respectively in detail that the transmission location of other user dedication control information in a unit frame is set according to a subframe interval in the case of a unit frame with 2 conversion points and a unit frame with 4 conversion points.

FIGS. 3a, 3b, and 3c are schematic diagrams of a method of transmitting user dedication control information according to a subframe interval in the case of a unit frame with 2 conversion points, wherein the subframe interval M can be set according to the configuration information of 16m/6e subframe and the proportion of downlink subframes to uplink subframes required by system deployment. The subframe interval default is set to be 1, and usually it can also be set to be 2. For the case where the number of 16m downlink subframes in a unit frame is relatively larger and the requirement for service delay is relatively lower, the system can configure a subframe interval as 3 or 4. The user dedication control information of the Nth subframe contains user's information such as data scheduling and power control in the Nth subframe, the (N+1)th, . . . , the (N+(M−1))th subframe. The information such as data scheduling and power control in a 16m subframe which does not contain user dedication control information is indicated in the closest subframe before the same with the closest subframe containing user dedication control information.

As the first 16m downlink subframe contains user dedication control information, the 16m downlink subframes containing user dedication control information in a unit frame are: 1, M+1, 2M+1, . . . , wherein, M is an interval of 16m subframes which contain user dedication control information. As shown in the figures, in a unit frame of 5 ms with 2 conversion points, the downlink/uplink conversion point is 302 and the uplink/downlink conversion point is 303, the proportion of downlink subframes to uplink subframes is 6:2, wherein, three 16m downlink subframes are contained.

FIG. 3a is a schematic diagram of transmission of user dedication control information with subframe interval of 1, illustrating 16m downlink subframe 1, 16m downlink subframe 2, and 16m downlink subframe 3, viz. each 16m downlink subframe contains user dedication control information 301, and the user dedication control information only indicates information such as data scheduling and power control in the present subframe.

FIG. 3b is a schematic diagram of transmission of user dedication control information with subframe interval of 2, wherein 16m downlink subframe 1 and 16m downlink subframe 3 contain user dedication control information 301, but 16m downlink subframe 2 does not contain user dedication control information. The user dedication control information in the 16m downlink subframe 1 contains user's information such as data scheduling and power control in the 16m downlink subframe 1 and the 16m downlink subframe 2, and the user dedication control information in the 16m downlink subframe 3 only contains user's information such as data scheduling and power control in the downlink subframe 3.

FIG. 3c is a schematic diagram of transmission of user dedication control information with subframe interval of 3, wherein only 16m downlink subframe 1 contains user dedication control information, and 16m downlink subframe 2 and 16m downlink subframe 3 do not contain user dedication control information. The user dedication control information in the 16m downlink subframe 1 contains user's information such as data scheduling and power control in the 16m downlink subframe 1, the 16m downlink subframe 2 and the 16m downlink subframe 3.

FIGS. 4a, 4b, and 4c are schematic diagrams of a method of transmitting user dedication control information according to a subframe interval in the case of a unit frame with 4 conversion points, wherein the setting of subframe interval M is the same as that of the case of 2 conversion points. The first 16m downlink subframe (set as downlink subframe 1 and downlink subframe i) after the uplink/downlink conversion point contains user dedication control information, so the 16m downlink subframes containing the user dedication control information in the unit frame are: 1, M+1, 2M+1, ... ; i, M+i, 2M+i, .... As shown in FIGS. 4a, 4b, and 4c, in a unit frame of 5 ms with 4 conversion points, the downlink/uplink conversion points are 402 and 404, and the uplink/downlink conversion points are 403 and 405, wherein the proportion of downlink subframes to uplink subframes is 6:2, the unit frame contains six 16m downlink subframes, and as the 16m downlink subframe 1 and the 16m downlink subframe 4 which are close to the uplink/downlink conversion points contain user dedication control information, 16m downlink subframe M+1, 2M+1, ... , 16m downlink subframe 4, M+4, 2M+4 contain the user dedication control information.

FIG. 4a is a schematic diagram of transmission of user dedication control information with a subframe interval of 1, wherein 16m downlink subframes 1, 2, 3, 4, 5 and 6 contain user dedication control information 401, viz. each of the 16m downlink subframes contains the user dedication control information 401, and the user dedication control information only indicates information such as data scheduling and power control in the present subframe.

FIG. 4b is a schematic diagram of transmission of user dedication control information with a subframe interval of 2, wherein 16m downlink subframes 1, 3, 4, and 6 contain user dedication control information 401, but 16m downlink subframes 2 and 5 do not contain user dedication control information. The user dedication control information in the 16m downlink subframe 1 contains user's information such as data scheduling and power control in the 16m downlink subframe 1 and the 16m downlink subframe 2, the user dedication control information in the 16m downlink subframe 4 contains user's information such as data scheduling and power control in the 16m downlink subframe 4 and the 16m downlink subframe 5; and the user dedication control information in each of the 16m downlink subframes 3 and 6 only contains user's information such as data scheduling and power control in the present subframe.

FIG. 4c is a schematic diagram of transmission of user dedication control information with subframe interval of 3, wherein 16m downlink subframes 1 and 4 contain user dedication control information, but 16m downlink subframes 2, 3, 5, and 6 do not contain user dedication control information. The user dedication control information in the 16m downlink subframe 1 contains user's information such as data scheduling and power control in the 16m downlink subframes 1, 2, and 3, and the user dedication control information in the 16m downlink subframe 4 contains user's information such as data scheduling and power control in the 16m downlink subframes 4, 5, and 6.

For the case where the transmission location of other user dedication control information in a unit frame is set according to a subframe bitmap, the system determines the length of a 16m subframe bitmap which indicates the transmission location of user dedication control information, according to the proportion of downlink subframes to uplink subframes and the configuration information of 16m/16e subframe.

For a unit frame with 2 conversion points, as the first 16m downlink subframe in the unit frame fixedly contains the user dedication control information, the length of the 16m subframe bitmap equals to the number of the 16m downlink subframes in the unit frame minus 1. The corresponding bitmap bits are set as follows: except the first 16m downlink subframe, the bitmap bit(s), corresponding to a 16m downlink subframe which contains the user dedication control information, are set as 1, and the bitmap bit(s), corresponding to a 16m downlink subframe which does not contain the user dedication control information, are set as 0; or the bitmap bit(s), corresponding to a 16m downlink subframe which contains the user dedication control information, are set as 0, and the bitmap bit(s), corresponding to a 16m downlink subframe which does not contain the user dedication control information, are set as 1.

For a unit frame of 4 conversion points, as the first 16m downlink subframe in the unit frame and the first 16m downlink subframe after the uplink/downlink conversion point fixedly contain the user dedication control information, the length of the 16m subframe bitmap equals to the number of the 16m downlink subframes in the unit frame minus 2. The corresponding bitmap bit is set as follows: except the first 16m downlink subframe in a unit frame and the first 16m downlink subframe after the uplink/downlink conversion point the bitmap bit(s) (bitmap for short), corresponding to a 16m downlink subframe which contains the user dedication control information, are set as 1, and the bitmap bit(s), corresponding to a 16m downlink subframe which does not contain the user dedication control information, are set as 0; or the bitmap bit(s), corresponding to a 16m downlink subframe which contains the user dedication control information, are set as 0, and the bitmap bit(s), corresponding to a 16m downlink subframe which does not contain the user dedication control information, are set as 1.

In the above, the 16m subframe bitmap further expresses the indication of user dedication control information. One method is: the control information sent in the Nth downlink subframe includes information related to the Nth downlink subframe, the (N+1)th downlink subframe, ... , the (N+L)th downlink subframe, wherein N is an integer greater than or equal to 1, L is the number of bitmap bits 0 between bitmap bit 1 corresponding to the Nth downlink subframe and the next bitmap bit 1.

That is, in the subframe bitmap in the present embodiment, if the bitmap corresponding to the subframe N is 1, and the bitmap corresponding to the subsequent L subframes adjacent to the subframe N is 0, it means that the subframe N contains user control information, but the subsequent L subframes adjacent to the subframe N do not contain the user control information, and the user dedication control information in the subframe N indicates information such as data scheduling and power control of the subframe N and the subsequent L subframes adjacent to the subframe N. If a subframe does not contain user control information, information such as data scheduling and power control of the present subframe is indicated in user control information in the closest subframe before the same with the closest subframe containing user control information. The cases of a unit frame with 2 conversion points and a unit frame with 4 conversion points are described respectively in detail in conjunction with FIGS. 5a, 5b, 5c and FIGS. 6a, 6b, 6c, and the subframes described hereafter are all 16m downlink subframes.

FIGS. 5a, 5b, and 5c are schematic diagrams of a method of transmitting user dedication control information according to a 16m subframe bitmap in the case of a unit frame with 2 conversion points. For the system deployment of a unit frame with 2 conversion points, the system determines the length of the 16m subframe bitmap of the transmission location of user dedication control information according to the proportion of downlink frames to uplink subframes and the configuration information of 16m/16e subframe. As the first 16m downlink subframe in the unit frame fixedly contains the user dedication control information 501, the length of the bitmap equals to the number of the 16m downlink subframes in the unit frame minus 1. For a 16m downlink subframe which contains the user dedication control information, the corresponding bitmap bit is set as 1, and for a 16m downlink subframe which does not contain the user dedication control information, the corresponding bitmap bit is set as 0. If the bitmap corresponding to the subframe N is 1, and the bitmap corresponding to the subsequent L subframes adjacent to the subframe N is 0, the user dedication control information in the subframe N indicates information such as data scheduling and power control of the subframe N and the subsequent L subframes adjacent to the subframe N. If a subframe does not contain user control information, information such as data scheduling and power control of the present subframe is indicated in the user control information in the closest subframe before the same with which closest subframe containing user control information.

As shown in FIGS. 5a, 5b, and 5c, in a unit frame of 5 ms with 2 conversion points, the downlink/uplink conversion point is 502, the uplink/downlink conversion point is 503, and the proportion of downlink subframes to uplink subframes is 6:2, wherein three 16m downlink subframes are contained, which indicates that the length of a 16m subframe bitmap of the transmission location of user dedication control information is 2 bits.

As shown in FIG. 5a, the subframe bitmap of 2 bits is "11", which indicates that, besides the 16m downlink subframe 1, the 16m downlink subframes 2 and 3 also contain user dedication control information, and the user dedication control information in each subframe only contains user's information such as data scheduling and power control of the present subframe.

As shown in FIG. 5b, the subframe bitmap of 2 bits is "01", which indicates that, besides the 16m downlink subframe 1, the 16m downlink subframe 3 also contain user dedication control information. The user dedication control information in the 16m downlink subframe 1 contains user's information such as data scheduling and power control in the 16m downlink subframe 1 and the 16m downlink subframe 2, and the user dedication control information in the 16m downlink subframe 3 only contains user's information such as data scheduling and power control in the downlink subframe 3.

As shown in FIG. 5c, the subframe bitmap of 2 bits is "10", which indicates that, besides the 16m downlink subframe 1, the 16m downlink subframe 2 also contains user dedication control information, but the 16m downlink subframe 3 does not contain the user dedication control information. The user dedication control information in the 16m downlink subframe 1 contains information such as data scheduling and power control in the 16m downlink subframe 1, and the user dedication control information in the 16m downlink subframe 2 contains user's information such as data scheduling and power control in the 16m downlink subframes 2 and 3.

For a unit frame with 4 conversion points, as shown in FIGS. 6a, 6b, and 6c, for the system deployment of 4 conversion points, the system determines the length of 16m subframe bitmap which indicates the transmission location of user dedication control information, according to the proportion of downlink subframes to uplink subframes. As the first 16m downlink subframe in the unit frame and the first 16m downlink subframe after the uplink/downlink conversion point fixedly contain the user dedication control information 601, the length of the bitmap equals to the number of the downlink 16m subframes in the unit frame minus 2. For a 16m downlink subframe which contains the user dedication control information, the corresponding bitmap bit is set as 1, for other 16m downlink subframe(s), the corresponding bitmap bit is set as 0 (the setting of bitmap bit is as mentioned above). If the bitmap corresponding to the subframe N is 1, and the bitmap corresponding to the subsequent L subframes adjacent to the subframe N is 0, the user dedication control information in the subframe N indicates information such as data scheduling and power control of the subframe N and the subsequent L subframes adjacent to the subframe N. If a subframe does not contain user control information, the data scheduling information of the present subframe is indicated in the user control information in the closest subframe before the same with the closest subframe containing the user control information. As shown in FIGS. 6a, 6b, and 6c, in a unit frame of 5 ms with 4 conversion points, the downlink/uplink conversion points are 602 and 604, the uplink/downlink conversion points are 603 and 605, the proportion of downlink subframes to uplink subframes is 6:2, and six 16m downlink subframes are contained in the unit frame, then the length of a 16m subframe bitmap of the transmission location of user dedication control information is 4 bits.

As shown in FIG. 6a, the subframe bitmap of 4 bits is "1111", which indicates that, besides the 16m downlink subframes 1 and 4, the 16m downlink subframes 2, 3, 5 and 6 also contain user dedication control information, the user dedication control information in each subframe only contains user's information such as data scheduling and power control of the present subframe.

As shown in FIG. 6b, the subframe bitmap of 4 bits is "0110", which indicates that, besides the 16m downlink subframes 1 and 4, the 16m downlink subframes 3 and 5 also contain user dedication control information. The user dedication control information of the downlink subframe 1 contains user's information such as data scheduling and power control in the subframes 1 and 2, the user dedication control information of the downlink subframe 5 contains user's information such as data scheduling and power control in the subframes 5 and 6, and the user dedication control information of the downlink subframes 3 and 4 only contain user's information such as data scheduling and power control in the present subframes.

As shown in FIG. 6c, the subframe bitmap of 4 bits is "1000", which indicates that, besides the 16m downlink subframes 1 and 4, the 16m downlink subframe 2 also contains user dedication control information. The user dedication control information of the downlink subframe 2 contains user's information such as data scheduling and power control in the downlink subframes 2 and 3, the user dedication control information of the downlink subframe 4 contains user's information such as data scheduling and power control in the downlink subframes 4, 5 and 6, and the user dedication control information of the downlink subframe 1 only contains user's information such as data scheduling and power control in the present subframe.

There is another method for a 16m subframe bitmap indicating user dedication control information: the control information sent in the Nth downlink subframe includes information related to the Nth downlink subframe; for a unit frame with 2 conversion points, control information contained in a preset subframe carries information related to a downlink subframe which does not send control information; for a unit frame with 4 conversion points, control information contained in a preset subframe between two conversion points carries information related to a downlink subframe which is between the two conversion points and does not send control information.

That is, if the bitmap corresponding to the subframe N is 1, the subframe N which contains user dedication control information only indicates information such as the data scheduling and power control of the present subframe (subframe N). For a unit frame with 2 conversion points, information such as data scheduling and power control in a subframe corresponding to bitmap of 0 and not containing user dedication control information are all indicated by the user dedication control information in the first downlink 16m subframe (viz. preset subframe) in the unit frame. For a unit frame with 4 conversion points, information such as data scheduling and power control in the subframe which does not contain user dedication control information are all indicated by the first downlink 16m subframe, after the uplink/downlink conversion point, which is the prior one closest to the present subframe. The cases of a unit frame with 2 conversion points and a unit frame of 4 conversion points are described respectively in detail in conjunction with FIG. 7 and FIG. 8, and the subframes described hereafter are all 16m downlink subframes.

FIG. 7 is a schematic diagram of another method of transmitting user dedication control information according to a 16m subframe bitmap in the case of a unit frame with 2 conversion points. As shown in FIG. 7, the subframe bitmap of 2 bits is "10", which indicates that, besides the 16m downlink subframe 1, the 16m downlink subframe 2 also contains user dedication control information, but the 16m downlink subframe 3 does not contain user dedication control information. The user dedication control information in the 16m downlink subframe 2 only indicates user's information such as data scheduling and power control in the present subframe, and the user dedication control information in the 16m downlink subframe 1 contains user's information such as data scheduling and power control in the 16m downlink subframe 1 and the 16m downlink subframe 3.

For a unit frame with 4 conversion points, as shown in FIG. 8, in a unit frame of 5 ms with 4 conversion points, downlink/uplink conversion points are 802 and 804, uplink/downlink conversion points are 803 and 805, the proportion of the downlink subframes to uplink subframes is 6:2, the unit frame contains six 16m downlink subframes, thus, the length of the 16m subframe bitmap of the transmission location of the user dedication control information is 4. The 16m subframe bitmap of 4 bits is "0100", which indicates that, besides the first downlink subframe 1 and the first downlink subframe 5 which is posterior one close to the uplink/downlink conversion point, the 16m downlink subframe 3 also contains user dedication control information. The user dedication control information of the 16m downlink subframe 3 only indicates user's information such as data scheduling and power control in the present subframe; user's information such as data scheduling and power control in the 16m downlink subframe 2 and downlink subframe 4 is indicated in the user dedication control information of the 16m downlink subframe 1; and user's information such as data scheduling and power control in the 16m downlink subframe 6 is indicated in the user dedication control information of the 16m downlink subframe 5.

From the above description, by transmitting user control information on part of the 16m downlink subframes and notifying the terminal of the above setting, the terminal can selectively open the RF transmission, viz. shutting down the RF transmission at the subframe location where user dedication control information is not included and no resource related to the terminal is assigned, and enter the micro sleep mode, which reduces power consumption of the terminal.

Apparatus Embodiment

The embodiment provides a control information receiving terminal, which is preferably used to receive the user dedication control information in the above method embodiment. FIG. 9 is a block diagram of the receiving terminal. As shown in FIG. 9, the receiving terminal mainly comprises: an acquiring module 10, a receiving module 20, and a decoding module 30, each of which is described hereafter in detail in conjunction with FIG. 9.

The acquiring module 10 is used for acquiring setting information of control information in a downlink subframe, which is sent by a transmission terminal, and the setting information herein preferably refers to 16m subframe bitmap information or a subframe interval for setting the location of control information in a unit frame, wherein the control information can be user dedication control information.

In the specific implementation process, the terminal can further comprise a storage module (not shown in the figure) for storing a default value, wherein the default value is setting information of the control information in a downlink subframe. The storage module and the acquiring module 10 can be configured integrally or separately, to corporately enable the terminal to acquire the setting information of the control information in the downlink subframe.

The receiving module 20 is used for receiving a unit frame sent by the transmission terminal.

The decoding module 30 is used for decoding the control information in the unit frame according to the preset subframe and the setting information.

From the above description, a base station sets a subframe interval or a 16m subframe bitmap, and sends the subframe interval or the 16m subframe bitmap to the terminal by means of broadcasting, wherein the subframe interval or the 16m subframe bitmap can be set according to the number of the conversion points, the proportion of downlink subframes to uplink subframes and the configuration information of 16m/16e subframe which are required by system deployment. The subframe interval is M which can be set as for 2, and in the case where the proportion of the 16m downlink subframes is relative higher and the requirement for service delay is not high, M can be set as 3 or 4.

In the apparatus, the decoding module 30 specifically comprises: a first decoding sub module 32, a second decoding sub module 34, wherein the first decoding sub module 32 is used for decoding the control information of the preset subframe, that is, decoding the subframes which fixedly contain the above user dedication control information; and the second decoding sub module 34 is used for decoding the control information of other subframes which are determined according to the setting information, that is, decoding other subframes containing user dedication control information according to the subframe interval or the 16m subframe bitmap information.

After receiving the unit frame, the terminal decodes user dedication control information at the location of the subframe which fixedly contain the user dedication control information in the unit frame, and according to the subframe interval or the 16m subframe bitmap information, the terminal decodes user dedication control information at the locations of other subframes containing user dedication control information, the locations being calculated from the 16m subframe interval or the 16m subframe bitmap, wherein, the location of the subframe which fixedly contains the user dedication control information can be obtained by referring to the location of the preset subframe in the above method embodiment, wherein the preset subframe is the first 16m downlink subframe after the uplink/downlink conversion point, viz. for a unit frame with 2 conversion points, the preset subframe is the first 16m downlink subframe in the unit frame; for a unit frame with 4 conversion points, the preset subframe is the first downlink subframe which is posterior one close to the uplink/downlink conversion point in the frame structure, viz. besides the first 16m downlink subframe in the unit frame, the location of the first 16m downlink subframe which is posterior one close to the second uplink/downlink conversion point is also included.

Owing to the above mentioned, by means of the above technical solutions in the embodiments of the present invention, the terminal can shut down the RF transmission at the subframe location where user dedication control information is not included and no resource related to the terminal is signed, according to the setting information of the received control information in the unit frame, and enter the micro sleep mode, which settles the problem of excessive power consumption at the 16m terminal in the prior art, and effectively reduces the power consumption at the terminal.

Obviously, those skilled in the art shall appreciate, all of the above modules or steps of the present invention can be realized by a universal computing device, they can be concentrated in a single computing device, or distributed in the network consisting of several computing devices, preferably, they can be realized by program codes executable by the computing device, such that they can be stored in a storage device to be executed by the computing device, or each of them can be manufactured into an integrated circuit module, or several modules or steps of them can be manufactured into a single integrated circuit module. In this way, the present invention is not limited to the combination of any particular hardware and software.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of the claims of the present invention.

What is claimed is:

1. A control information transmission method, comprising:
   notifying a terminal of setting information of control information in a downlink subframe; and
   transmitting the control information to the terminal in one preset subframe or more than one preset subframes and other subframes determined according to the setting information;
   wherein the setting information is a subframe bitmap;
   wherein the subframe bitmap is set according to the following manner:
   except the first downlink subframe, setting as 1 one or more bitmap bits, corresponding to the downlink subframe which contains the control information, and setting as 0 one or more bitmap bits corresponding to the downlink subframe which does not contain the control information; alternatively setting as 0 one or more bitmap bits corresponding to the downlink subframe which contains the control information, and, setting as 1 one or more bitmap bits corresponding to the downlink subframe which does not contain the control information; and
   wherein the control information which is sent in the Nth downlink subframe comprises information related to the Nth downlink subframe, the (N+1)th downlink subframe, . . . , the (N+L)th downlink subframe, wherein N is an integer greater than or equal to 1, L is the number of bitmap bits 0s between the bitmap bit 1 corresponding to the Nth downlink subframe and the next bitmap bit 1.

2. The method according to claim 1, wherein the step of notifying the terminal of setting information of control information in the downlink subframe comprises one of the following:
   notifying the terminal of the setting information of the control information in the downlink subframe in the form of sending a message; and
   notifying the terminal of the setting information of the control information in the downlink subframe in the form of setting a default value in the terminal in advance.

3. The method according to claim 1, wherein the preset subframe is a first 802.16m downlink subframe after an uplink/downlink conversion point.

4. The method according to claim 3, wherein for a unit frame with 2 conversion points, the preset subframe is the first 802.16m downlink subframe in a unit frame; and for a unit frame with 4 conversion points, the preset subframes are the first 802.16m downlink subframe in a unit frame and the first 802.16m downlink subframe after the uplink/downlink conversion point.

5. The method according to claim 1, wherein,
   the setting information is a subframe interval.

6. The method according to claim 5, wherein,
   the subframe interval is 1 subframe, 2 subframes, 3 subframes, or 4 subframes.

7. The method according to claim 5, wherein the subframe interval is set according to a proportion of uplink subframes to downlink subframes in a unit frame and subframe configuration information.

8. The method according to claim 5, wherein,
   the control information which is sent in the Nth downlink subframe comprises information related to the Nth downlink subframe, the (N+1)th downlink subframe, . . . , the (N+(M−1))th downlink subframe, wherein N is an integer greater than or equal to 1, and M is the subframe interval.

9. The method according to claim 1, wherein the length of the subframe bitmap is determined according to a proportion of downlink subframes to uplink subframes and 802.16m/16e subframe configuration information.

10. The method according to claim 9, wherein, for the unit frame with 2 conversion points, the length of the subframe bitmap equals to the number of the downlink 802.16m subframes in the unit frame minus 1; and for the unit frame with 4 conversion points, the length of the subframe bitmap equals to the number of the downlink 802.16m subframes in the unit frame minus 2.

11. The method according to claim 1, wherein, the control information which is sent in the Nth downlink subframe comprises information related to the Nth downlink subframe;

for a unit frame with 2 conversion points, the control information contained in the preset subframe carries information related to a downlink subframe which does not send the control information; and for a unit frame with 4 conversion points, the control information contained in the preset subframe between two conversion points carries information related to a downlink subframe that is between the two conversion points and does not send the control information.

12. A control information receiving terminal for receiving control information, comprising a processor configured to execute program units stored on a memory, the program units comprising:

an acquiring module, configured to acquire setting information of the control information in a downlink subframe with the control information sent by a transmission terminal;

a receiving module, configured to receive a unit frame sent by the transmission terminal; and a decoding module, configured to decode control information in the unit frame according to one preset subframe or more than one preset subframes and the setting information;

wherein the setting information is a subframe bitmap;

wherein the subframe bitmap is set according to the following manner:

except the first downlink subframe, setting as 1 one or more bitmap bits, corresponding to the downlink subframe which contains the control information, and setting as 0 one or more bitmap bits corresponding to the downlink subframe which does not contain the control information; alternatively setting as 0 one or more bitmap bits corresponding to the downlink subframe which contains the control information, and, setting as 1 one or more bitmap bits corresponding to the downlink subframe which does not contain the control information; and wherein the control information which is sent in the Nth downlink subframe comprises information related to the Nth downlink subframe, the (N+1)th downlink subframe, . . . , the (N+L)th downlink subframe, wherein N is an integer greater than or equal to 1, L is the number of bitmap bits 0s between the bitmap bit 1 corresponding to the Nth downlink subframe and the next bitmap bit 1.

13. The terminal according to claim 12, wherein the terminal further comprises:

a storage module, configured to store a default value, the default value being setting information of the control information in a downlink subframe.

14. The terminal according to claim 12, wherein the preset subframe is a first 802.16m downlink subframe after an uplink/downlink conversion point.

15. The terminal according to claim 12, wherein for a unit frame with 2 conversion points, the preset subframe is the first downlink subframe in a unit frame; and for a unit frame with 4 conversion points, the preset subframes are the first downlink subframe in a unit frame and the first downlink subframe after an uplink/downlink conversion point.

16. The terminal according to claim 12, wherein the setting information is a subframe interval.

17. The terminal according to claim 12, wherein the decoding module comprises:

a first decoding sub module, configured to decode the control information of the one preset subframe or more than one preset subframes; and a second decoding sub module, configured to decode control information of other subframes determined according to the setting information.

* * * * *